United States Patent [19]
Gliebe et al.

[11] Patent Number: 5,156,353
[45] Date of Patent: Oct. 20, 1992

[54] AIRCRAFT PYLON

[75] Inventors: Philip R. Gliebe; Rudramuni K. Majjigi, both of Cincinnati, Ohio

[73] Assignee: General Electric Company, Cincinnati, Ohio

[21] Appl. No.: 37,764

[22] Filed: Apr. 13, 1987

[51] Int. Cl.$^5$ ............................................. B64D 27/00
[52] U.S. Cl. ......................................... 244/54; 244/55; 244/130
[58] Field of Search ................ 244/53 R, 54, 55, 12.6, 244/65, 69, 130; 440/66; 415/DIG. 1

[56] References Cited

U.S. PATENT DOCUMENTS

| | | | |
|---|---|---|---|
| 1,868,832 | 7/1932 | Henter et al. | 244/65 |
| 1,903,823 | 4/1933 | Lougheed | 244/130 |
| 2,041,794 | 5/1936 | Stalker | 244/208 |
| 2,078,854 | 4/1937 | Jones | 244/208 |
| 2,117,607 | 5/1938 | Griswold, 2nd | 244/216 |
| 2,387,526 | 10/1945 | Nagamatsu | 244/210 |
| 3,149,804 | 9/1964 | Lite, Jr. | 244/209 |
| 3,172,621 | 3/1965 | Erwin | 244/44 |
| 3,179,354 | 4/1965 | Alvarez-Calderon | 244/210 |
| 3,572,960 | 3/1971 | McBride | 415/115 |
| 3,599,749 | 8/1971 | Millman | 181/33 HC |
| 3,685,610 | 8/1972 | Bschorr | 181/33 L |
| 3,695,388 | 10/1972 | Paxhia et al. | 181/33 F |
| 3,726,091 | 4/1973 | Tontini | 60/264 |
| 3,826,331 | 7/1974 | Scharton et al. | 181/33 HC |
| 4,074,878 | 2/1978 | Sherman | 244/203 |
| 4,199,295 | 4/1980 | Raffy et al. | 415/115 |
| 4,644,889 | 2/1987 | Krans | 244/209 |

FOREIGN PATENT DOCUMENTS

| | | | |
|---|---|---|---|
| 59-57092 | 4/1984 | Japan | 440/66 |
| 1024963 | 4/1966 | United Kingdom . | |
| 1125121 | 8/1968 | United Kingdom . | |
| 1209723 | 10/1970 | United Kingdom . | |
| 2138507 | 10/1984 | United Kingdom | 244/54 |

*Primary Examiner*—Galen Barefoot
*Attorney, Agent, or Firm*—Jerome C. Squillaro; John R. Rafter

[57] ABSTRACT

An aircraft propulsion system includes at least one pusher propeller mounted to a nacelle mounted to the aircraft by a pylon which produces a wake which impinges upon the propeller. The wake from the pylon is modified to reduce noise and vibration produced by the propeller interaction with the wake. The propulsion system may include a pair of counterrotating pusher propellers.

3 Claims, 3 Drawing Sheets

AIRCRAFT PYLON

The invention relates to a structure which attaches an aircraft engine to an aircraft fuselage and, more particularly, to the aerodynamic aspects and noise generation aspects of such a structure.

BACKGROUND OF THE INVENTION

FIG. 1 illustrates an aircraft fuselage 3 powered by tail mounted, counterrotating, pusher prop fans 6A and 6F. The prop fans are driven by an engine (not shown) contained within a nacelle 9. Extending between the nacelle 9 and the aircraft fuselage is a pylon 12, more clearly shown in FIG. 2. The pylon is an aerodynamic fairing which surrounds the structure which supports the engine, and other apparatus such as fuel and electrical lines, which connect to the engine.

The pylon 12 sheds a wake 15 during flight, no matter how well the pylon is designed.

One reason is that, as shown in FIG. 2A, the thickness 16 of boundary layer 16A progressively increases in the downstream direction 17, causing a velocity profile 17A to exist at the trailing edge 17B. (The velocity profile 17A illustrates the variation in velocity of air molecules as a function of distance from the pylon. For example, velocity vector 17C represents the air velocity at distance 17D from the pylon centerline 17E.)

The velocity profile 17A at the pylon trailing edge produces a "velocity defect," $V_d$ in the wake which is the difference in velocity between the freestream velocity, $V_o$ (outside the wake), and the local velocity, $V_1$, in this example.

The velocity defect region has an accompanying "mass flow defect," and consequently, air, indicated by path 17H, tends to be entrained into the velocity defect region 17F causing turbulence.

A second reason is that the angle of attack of the fuselage 3 will change during flight, while the pylon is designed for producing a minimal wake at a single, optional angle of attack. Consequently, the pylon produces a larger wake at angles which differ from the optimal angle.

The wake has two undesirable side effects. One, when the prop fan blades pass through the wake 15, they chop the wake, producing noise. An exaggerated example, shown in FIG. 3, will illustrate this point. When a ship's propeller 18 operates partly submerged in water 21, each blade makes a noise as it enters the water. The water can be viewed as analogous to the wake 15 in FIG. 2; noise is produced when each propeller blade passes through the wake 15.

If each prop fan has eight blades and rotates at 20 revolutions per second, then 160 chops occur per second. This situation resembles a noise source broadcasting at 160 Hz, together with overtones.

A second side effect results from the fact that the lift produced by a propeller blade is a function of the angle of attack of the blade with respect to the incoming air. When a blade enters the wake 15, the angle of attack changes as shown in FIG. 2B.

The angle of attack A1 experienced by blade 6A is the vector "sum 1" of two vectors: (1) freestream vector $V_o$, resulting from the forward speed of the aircraft and (2) vector "rotation" representing the rotational velocity of the blade 6A.

When the blade 6A enters the wake, freestream vector $V_o$ becomes reduced, as illustrated by vector $V_1$ (also shown in FIG. 2A). Consequently, the vector "sum 1" changes to vector "sum 2." This latter vector "sum 2" causes a higher angle of attack A2 to occur.

As a result, the prop fan blade 6A becomes more highly loaded, and the lift load in the direction of arrow 26 of FIG. 1 (thrust direction) becomes greater, causing the blade to flex in that direction. Given that, for example, the type of engine shown in FIG. 2 can be of the 25,000 pound thrust class, and that a total of sixteen prop fan blades can be used, the total loading per blade is approximately 1,560 pounds (25,000 divided by 16). Even a small percentage increase in thrust during passage through the wake 15, such as a ten percent increase, can cause significant stresses on the blades and potential damage to the blades over a period of time. An example will illustrate this.

Assume that the blade radius 31 in FIG. 2 is five feet. Thus, the circle described by the tip 33 of each blade is approximately thirty-one feet in circumference. (Five-times-two-times-pi equals approximately thirty-one.) Assume, as above, a speed for each prop fan of twenty revolutions per second. Therefore, in this example, the tip region 33 of each blade is traveling along the circumference at the rate of about 620 feet per second. (Thirty-one feet per revolution times twenty revolutions per second.)

If the wake is assumed to be one-foot high, dimension 38, and if it is assumed that the wake provides a ten percent increase in lift during an excursion by a blade through it, then each blade experiences an impulse of ten percent of the thrust load, or about one-hundred-fifty pounds, applied during an interval of 1/620 seconds, that is, an interval of about 1.6 milliseconds. Further, at 20 revolutions per second, each blade passes through the wake once every 1/20 second, or every 50 milliseconds. Restated, a cyclic load of 150 pounds is applied for 1.6 milliseconds to each blade every 50 milliseconds. It is clear that such a cyclic loading should be avoided.

OBJECT OF THE INVENTION

It is an object of the present invention to provide a new and improved aircraft propulsion system, whereby mounting pylon-induced noise and cyclic loads are significantly reduced.

SUMMARY OF THE INVENTION

In one form of the invention, the wake produced by a pylon supporting a pusher propeller is reduced, thereby reducing both wake chopping noise and periodic propeller blade bending occurring during excursions through the wake. Several approaches can reduce the wake, as by ejecting gases into the airstream near the trailing edge of the pylon, by controlling flow separation from the pylon by withdrawing and expelling air through perforations in the pylon surface, as well as by other approaches.

BRIEF DESCRIPTION OF THE DRAWING

FIG. 2AA is a variant of FIG. 2A.

DETAILED DESCRIPTION OF THE INVENTION

Figure 4:
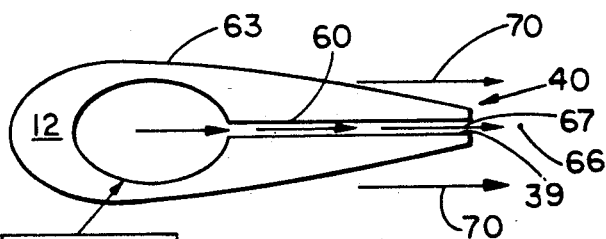
FIG. 4 illustrates in cross section the pylon 12, and a nozzle which ejects pressurized gas near the trailing edge 40 in order to reduce the wake by filling in the low-velocity wake region with high velocity air.
Figure 5A:
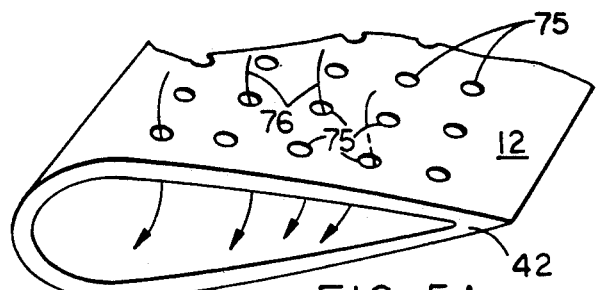
FIGS. 5A-5C illustrate a plurality of perforations contained within the surface of the pylon 12, and which are attached to a low-pressure manifold 42. Selectively withdrawing airstreams through the holes can delay the onset 44 in FIG. 5B of separation as compared with the onset 44B in FIG. 5C as well as reduce the magnitude and size of the wake which results even without separation 44.
Figure 5B:
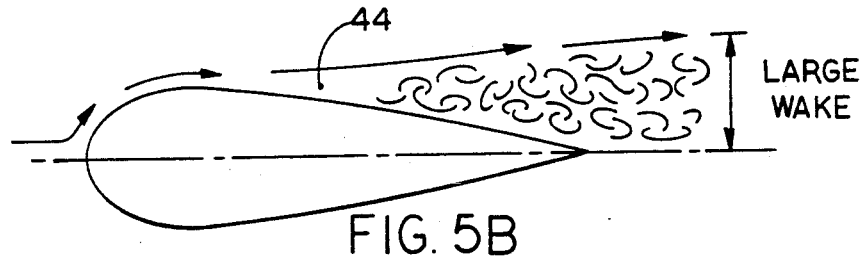
Figure 5C:
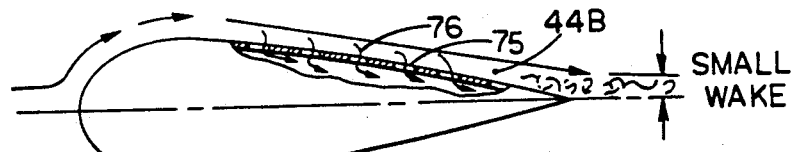
Figure 6:
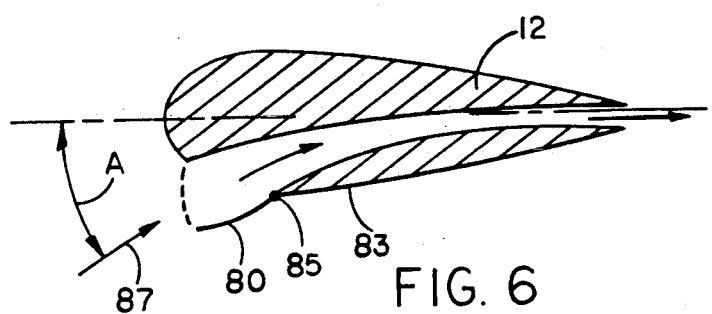
FIG. 6 illustrates another form of the invention.

Several forms of the invention are shown in FIGS. 4-6. In FIG. 4, pylon 12 contains a conduit 60 which is connected to a manifold 63 to which is supplied high-pressure air, at least at a pressure higher than that at point 66 downstream of the trailing edge. The conduit 60 supplies a jet of air 67 which raises the overall velocity of the air in the wake region so that wake velocity defect in FIG. 2A is reduced, resulting in reduced air entrainment from the freestream and thereby resulting in reduced variations in angle of attack which the fan blades see as they cut through the wake region.

Manifold 63 can be pressurized by several known means, including, for example, a compressor bleed in the case when the engine is a gas turbine engine, or by a small compressor, both known in the art.

In FIG. 5A, numerous perforations 75 are contained in the surface of the pylon 12. (The perforations are shown oversized. In practice, they would be about 1-20 mils in diameter.) The perforations are connected to a manifold 42 which is coupled to a low pressure source. Low pressure sources, such as vacuum pumps, are known in the art. The low pressure causes air to be withdrawn from the boundary layer (not shown) as indicated by arrows 76, thus retarding flow separation from point 44 in FIG. 5B to point 44B in FIG. 5C.

Another form of the invention is shown in FIG. 6, wherein a movable door 80 is positioned on the bottom surface 83 of pylon 12. Door 80 can rotate about pivot 85. When the pylon sees an angle of attack A, door 80 is opened to supply channel 60 with ram air 87, thus providing jet 67 to reduce the mass flow defect.

Several important aspects of the invention are the following:

1. Even though the wake 15 results from boundary layer formation, as discussed in connection with FIG. 2A, the wake is, in some respects, also a result of the lift produced by the pylon. That is, even if the pylon 12 were perfectly symmetric in cross section, as shown in FIG. 4, nevertheless, at a given angle of attack, indicated by angle A, with respect to incoming airstream 101, pylon 12 will produce lift. The existence of lift is generally accompanied by (1) vortex formation, (2) turbulence, (3) at least a mild downstream disturbance, or any combination of the preceding effects, located in the downstream flow field. Thus, to the extent that one can control lift, one can control wake formation. Therefore, the change in flow separation of FIGS. 5A-C can be viewed as controlling the wake through controlling the lift provided by the pylon 12.

2. The angle of attack of the pylon 12 will, in general, change under differing flight conditions. For example, if the pylon 12 experiences a given angle during flight, this angle will increase when the angle of attack of the aircraft increases during an approach for landing. Therefore, a wake of greater intensity may be produced during landing maneuvers. Consequently, the intensity of wake reduction measures should be increased at this time. For example, greater air can be blown through conduit 60 in FIG. 4. Greater air can be withdrawn through perforations 75 in FIG. 5A.

In one embodiment, these wake reduction measures are directly controlled by the pilot using servomechanisms known in the art, and illustrated by the block labeled "Flow Control" in FIG. 4. However, automatic control, based on direct or indirect wake measurement is envisioned. Further, control of wake reduction measures based on a schedule is also envisioned.

Scheduling refers to a two-stage approach. First, one operates the aircraft under varying flight conditions and measures wake size. Then, later, when similar flight conditions occur which caused large wake sizes, the wake reduction measures are undertaken. That is, wake reduction is undertaken in response to the presently measured flight conditions (which may include wake measurement) which have previously shown to cause wakes.

An invention has been described wherein the wake ordinarily produced by a pylon which supports a pusher propeller is reduced in order to both (1) reduce the wake chopping noise produced by the propeller, and (2) to reduce the periodic blade flexing inflicted upon the propeller blades by the wake. Further, the degree of wake reduction is modified as needed as flight characteristics change. For example, it is possible that a greater wake reduction will be necessary during a high angle of attack landing approach. An example of a calculation of the amount of air flow needed for a specific case will now be given.

EXAMPLE

The approach of the following calculation will be to find the total area of the velocity defect region 17F in FIGS. 2A and 2AA, and then compute the mass required to fill the area. This will be done by assuming the velocity profile 17A in FIG. 2AA to be a gaussian function of the variable dw (semi-wake width) and $V_{dc}$ (velocity defect on centerline), both indicated in the FIG. 2AA. However, these two variables are not directly observable, but can be inferred from $C_D$ (drag coefficient), $V_o$ (freestream velocity), and pylon chord length (c), which are observable, as the calculation will show.

As shown in FIG. 2AA, the mass flow dm [pounds mass per second] needed to fill the hatched element of thickness dy is $$d\dot{m} = p(V_o - V_l) \, dy \cdot I \qquad (1)$$

$$d\dot{m} = p V_d \, dy \cdot I \qquad (2)$$

wherein p = density of air (assumed constant)
$V_d$ = velocity defect
I = unit depth (perpendicular to paper)

Now the problem becomes one of ascertaining the total mass flow for all elements dy.

Figure 1:
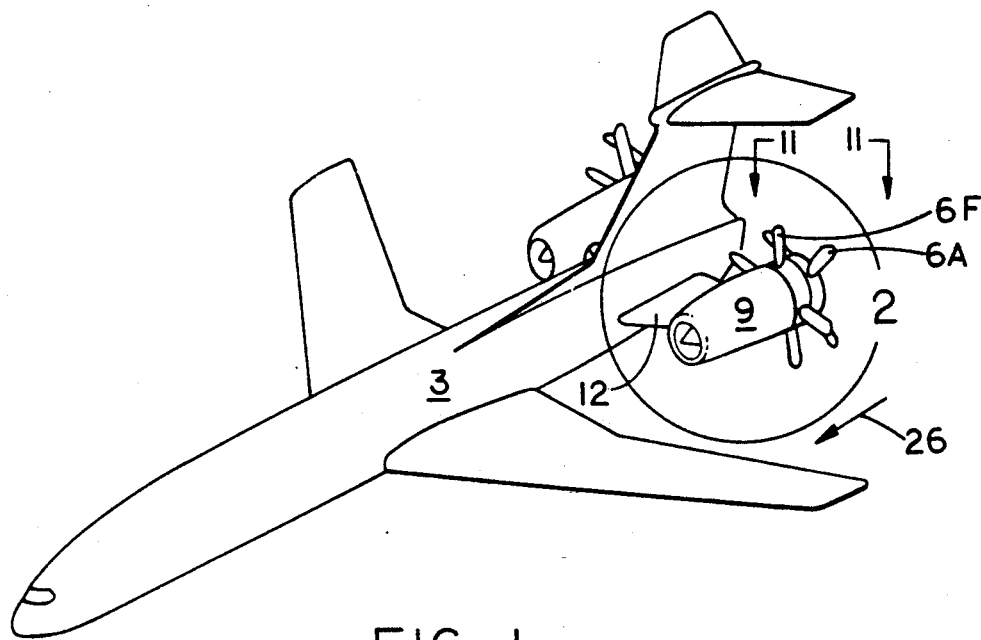
FIG. 1 illustrates an aircraft powered by tail-mounted, counterrotating prop fans or propellers.
Figure 2:
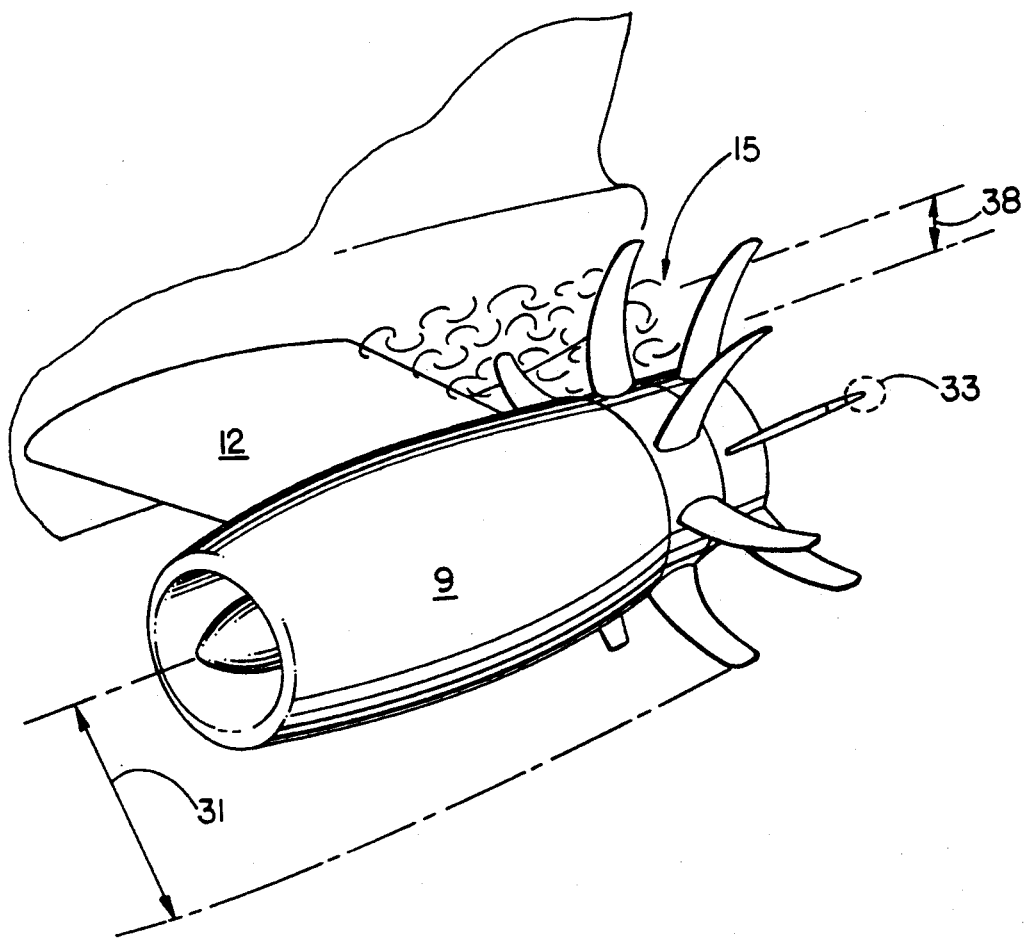
FIG. 2 illustrates in more detail circled region 2 in FIG. 1, including the wake 15 shed by the pylon 12.
Figure 2A:
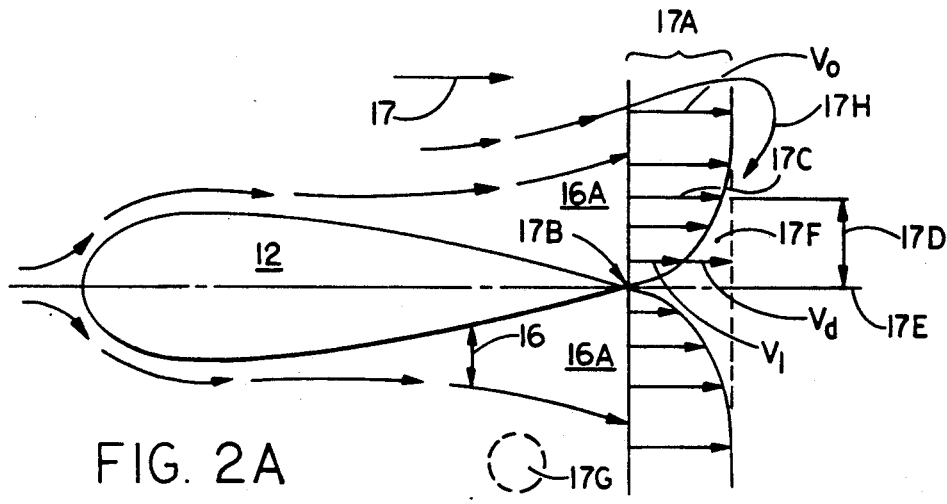
FIG. 2A illustrates the viscous boundary layer flow on the surface of the pylon 12, shown in cross section, and the resultant wake produced.
Figure 2A:
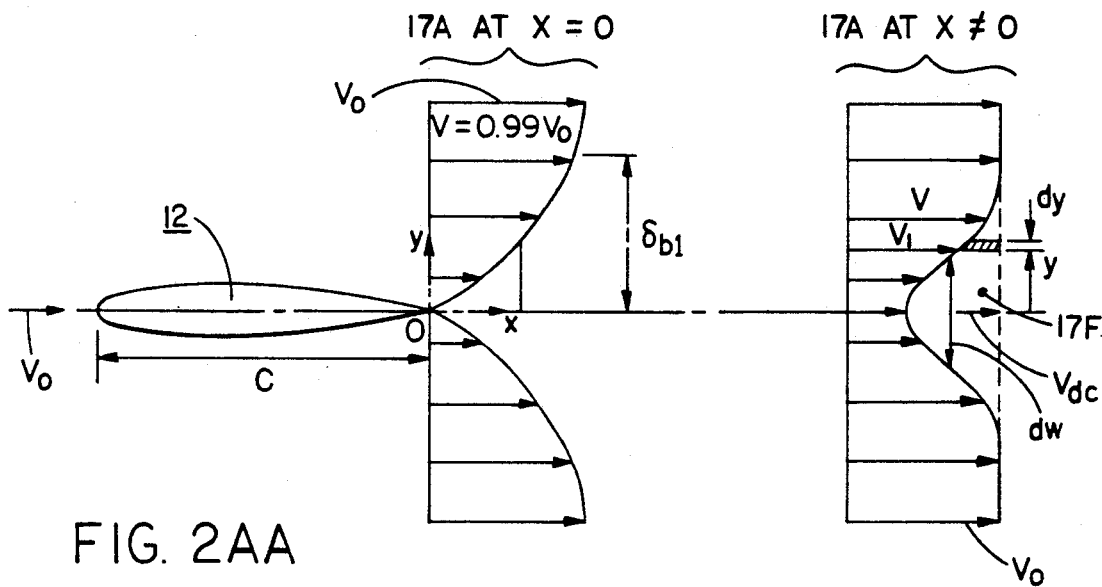
Figure 2B:
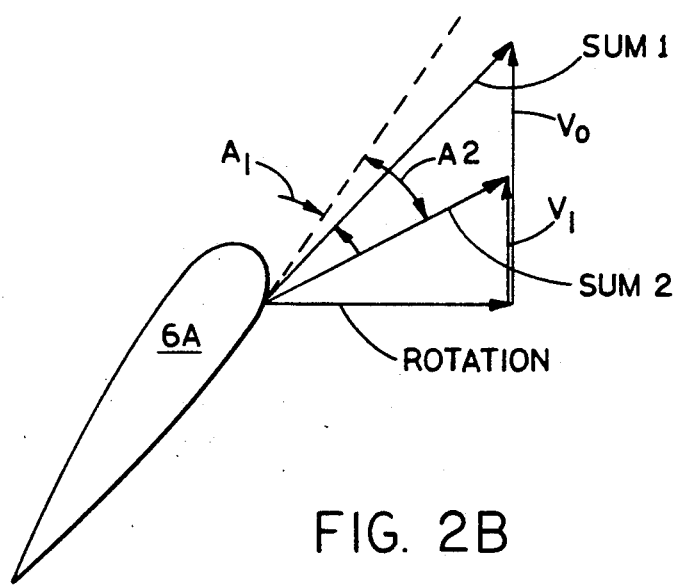
FIG. 2B illustrates angles of attack $A_1$ and $A_2$ of the propeller blade 6A.
Figure 3:
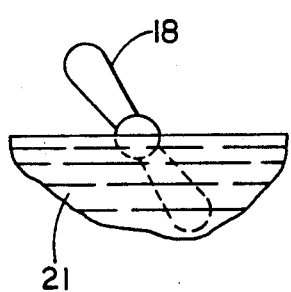
FIG. 3 illustrates a ship's propeller partly submerged in water.

The shape of the velocity profile 17A is generally assumed to be gaussian by those skilled in the art, and thus can be described by the following function:

$$\frac{V_d}{V_{dc}} = \exp(-1)\left(\pi\left(\frac{y}{dw}\right)^2\right) \quad (3)$$

$$V_d = V_{dc}\exp(-1)\left(\pi\left(\frac{y}{dw}\right)^2\right) \quad (4)$$

wherein
$V_d$ = velocity defect, as above, shown in FIG. 2,
$V_{dc}$ = velocity defect on centerline, shown in FIG. 2AA, and
$dw$ = semi-wake width, shown in FIG. 2AA.

It is clear that an integration of equation (2) will provide total mass flow, $\dot{m}$:

$$\dot{m} = \int_{-\infty}^{\infty} p V_d dy \quad (5)$$

and that equation (4) offers an expression for $V_d(y)$. However, values for $V_{dc}$ and $dw$ in equation (4) must be found.

These values can be derived from the work of A. Silverstein, S. Katzoff, and W. Bullivant in "Downwash and Wake Behind Plain and Flapped Airfoils," NACA Report No. 651, Jun. 23, 1938. These researchers have found that $$V_{dc} = \frac{1.21\sqrt{C_D}}{\left(\frac{x}{c} + 0.3\right)} \equiv F \quad (6)$$

$$V_{dc} = FV_o \quad (6A)$$

and $$\frac{dw}{c} = 0.680\sqrt{C_D}\sqrt{\left(\frac{x}{c} + 0.15\right)} \equiv G \quad (7)$$

$$dw = Gc \quad (7A)$$

wherein
$C_D$ = coefficient of drag of pylon
$C$ = chord (distance c in FIG. 2AA) of pylon and G and F are newly defined variables for simplification.

Substituting (4) into (5) yields $$\dot{m} = \int_{-\infty}^{\infty} p\exp(-1)\left(\pi\left(\frac{y}{dw}\right)^2\right)V_{dc}dy \quad (8)$$

Substituting (6A) and (7A) into 8 yields $$\dot{m} = \int_{-\infty}^{\infty} p\exp(-1)\left(\pi\left(\frac{y}{Gc}\right)^2\right)FV_o dy \quad (9)$$

If one assumes the velocity profile 17A in FIG. 2AA to be symmetrical about $V_{dc}$, then one can change the lower limit of integration to zero, while multiplying the expression by two. Now, equation (9) has the form of $$\int_0^{\infty} e^{-a^2y^2} dy = \frac{\sqrt{\pi}}{2a} \quad (10)$$

wherein $$a = \frac{\sqrt{\pi}}{Gc}$$

Equation (10) is the error function, ERF.
Applying (10) to (9), one obtains $$\dot{m} = p\,G\,c\,FV_o \quad (11)$$

Replacing G and F in (11) from (6) and (7) gives $$\dot{m} = (p)0.68\sqrt{C_D}\sqrt{\left(\frac{x}{c} + 0.15\right)}(C)\frac{(1.21\sqrt{C_D})}{\left(\frac{x}{c} + 0.3\right)}V_o \quad (12)$$

Setting $x = 0$, which is its value at the trailing edge, simplifies (12) to the following:

$$\dot{m} = (p)0.68\sqrt{C_D}\sqrt{0.15}\,(C)\frac{1.21\sqrt{C_D}}{0.3}V_o \quad (13)$$

The following values may be assumed:
$p = 2.3 \times 10^{-3}$ slugs/ft$^3$ at 1,000 feet altitude
$C_d = 0.02$
$C = 4$ feet
$V_o = 400$ feet/sec Substituting these values, together with the conversion factor of 32.2 lbs. mass per slug, gives the following:

$$\dot{m} = 2.3 \times 10^{-3}\frac{\text{slug}}{\text{ft}^3}(0.68)\sqrt{0.02}\sqrt{0.15}\,(4\text{ ft})\frac{1.21\sqrt{0.02}}{0.3}\left(400\frac{\text{ft}}{\text{sec}}\right)\left(32.2\frac{\text{lb}\cdot\text{m}}{\text{slug}}\right) \quad (14)$$

$$\dot{m} = 2.52\frac{\text{lb}\cdot\text{m}}{\text{ft} - \text{sec}} \quad (15)$$

The unit of feet in the denominator results from the unit depth "1" in equation (1). That is, the mass flow is 2.52 pounds of air per second per lineal foot of slot 60 in FIG. 4.

This mass flow is a reasonable amount to be bled from the compressor of a gas turbine engine in the 15,000 pound thrust class without undue penalty.

This example illustrates an additional means of controlling wake reduction based on freestream velocity and altitude for a given pylon length. The expressions derived above provide the mass flow defect as a function of these variables, and so the amount of flow needed in order to remedy the defect can be controlled based on freestream velocity and density (i.e., altitude).

Numerous substitutions and modifications can be undertaken without departing from the true spirit and scope of the invention as defined by the following claims.

We claim:

1. In an aircraft propulsion system which comprises at least one pusher propeller located downstream of a pylon, which produces turbulence which the propeller ingests, the improvement comprising:
   (a) means for modulating the turbulence produced by the pylon, and
   (b) control means for controlling the modulation of (a) in response to flight conditions, including different angles of attack of the aircraft.

2. A system in accordance with claim 1 in which the means of (a) comprises a source for injecting a gas near the trailing edge of the pylon.

3. A system according to claim 1 in which the means of (a) comprises perforations in the surface of the pylon for controlling boundary layer thickness.

* * * * *